(12) United States Patent
Fujita

(10) Patent No.: US 7,054,078 B2
(45) Date of Patent: May 30, 2006

(54) OBJECTIVE LENS DRIVING DEVICE

(75) Inventor: Masayuki Fujita, Tokyo (JP)

(73) Assignee: NEC Corporation (JP)

( * ) Notice: Subject to any disclaimer, the term of this patent is extended or adjusted under 35 U.S.C. 154(b) by 305 days.

(21) Appl. No.: 10/263,966

(22) Filed: Oct. 2, 2002

(65) Prior Publication Data

US 2004/0004774 A1 Jan. 8, 2004

(30) Foreign Application Priority Data

Oct. 2, 2001 (JP) ............................. 2001-306513

(51) Int. Cl.
*G11B 7/00* (2006.01)

(52) U.S. Cl. .................................. 359/814; 369/44.22

(58) Field of Classification Search ............. 369/44.15, 369/44.16, 53.19, 44.22; 720/682, 683; 359/814
See application file for complete search history.

(56) References Cited

U.S. PATENT DOCUMENTS 6,449,229 B1 * 9/2002 Kim et al. ............... 369/53.19

2001/0030815 A1 * 10/2001 Suh .............................. 359/814
2003/0193854 A1 * 10/2003 Lee et al. ................. 369/44.16

FOREIGN PATENT DOCUMENTS

| JP | 2-289927 | 11/1990 |
| JP | 9-231595 | 9/1997 |
| JP | 11-306570 | 11/1999 |

* cited by examiner

*Primary Examiner*—Hoa T. Nguyen
*Assistant Examiner*—Lixi Chow
(74) *Attorney, Agent, or Firm*—Ostrolenk, Faber, Gerb & Soffen, LLP (57) ABSTRACT

When a lens holder 2A is in a neutral position, a ratio of a gap between opposing surfaces of one tilt magnet 10a, 10b and one tilt coil 5 which oppose to each other, to a radial direction thickness of the tile magnet 10a, 10b, is in the range of 1/2 to 1/3. In at least one tilt coil of the tilt coils, a ratio of a light axis direction inside distance of the tilt coil to a light axis direction height of the tilt magnet, is in the range of 1/1.5 to 1/4. With this arrangement, even if the objective lens is shifted in a tracking direction or in a focusing direction, variation in the sensitivity and the linearity of the radial tilt movement is small, and an internally accessible area is increased.

8 Claims, 11 Drawing Sheets

CENTER SIDE ⟵⟶ PERIPHERY SIDE

CENTER SIDE ⟵⟶ PERIPHERY SIDE

Fig. 7b

CENTER SIDE ⟵⟶ PERIPHERY SIDE

CENTER SIDE ⟵⟶ PERIPHERY SIDE

OBJECTIVE LENS DRIVING DEVICE

BACKGROUND OF THE INVENTION

The present invention relates to an objective lens driving device for use in an optical disk apparatus, and more specifically to an objective lens driving device featured in location of a coil and a magnet which constitute a compensating mechanism for a tilt in a radial direction of an optical disk medium.

Generally, in an optical disk apparatus, a laser light emitted from a light source typified by a semiconductor laser is condensed and irradiated onto an information recording surface of the optical disk medium in order to record, reproduce or erase information.

In this optical disk medium, a track position in a recording surface on which the information is recorded, ceaselessly displaces in a focusing direction corresponding to a direction perpendicular to the plane of the optical disk medium and in a tracking direction corresponding to a radial direction of the optical disk medium, because of a surface swing and a eccentricity.

Therefore, a conventional optical disk apparatus is required to drive the objective lens to an optimum position in accordance with a desired track. For this purpose, the conventional optical disk apparatus is so constructed that the objective lens is driven in the focusing direction and in the tracking direction by an objective lens driving device.

Recently, with an increased amount of information processed in a computer, the recording amount required in the optical disk has the tendency of increasing. For the increased recording amount of the optical disk, a recording density can be increased by reducing the condensed beam diameter of the laser light irradiated onto the information recording medium. In addition, the reduction of the beam diameter can be realized by shortening the wavelength of a laser light source and by increasing the NA (numerical aperture) of the objective lens.

Here, in the case that the high-density large-capacity recording is realized by increasing the NA of the objective lens, when information is recorded to, or erased or reproduced from the optical disk medium, the margin of tilt of the optical disk medium to a light axis of the laser beam condensed by the objective lens will become small, with the result that it becomes necessary to compensate the objective lens for a tilt of the optical disk medium in a radial direction.

Therefore, the objective lens driving devices becomes required to have a mechanism for driving the objective lens not only conventionally in the focusing direction and in the tracking direction but also in a radial-tilt direction.

A simple means for enlarging the information recording area in the optical disk medium having the same shape and size, enables to the recording capacity of the optical disk medium, even if it is slight. In this case, a size of a light pickup is particularly minimized in the radial direction in order to access an innermost area of the optical disk medium.

Furthermore, recently, an optical disk apparatus has been proposed which is so configured to record, reproduce and erase recording medium having different thicknesses such as CD (Compact Disk) and DVD (Digital Versatile Disk), by use of one objective lens and two laser sources.

In this case, since the height of the information recording surface and the thickness of the cover glass vary from one disk to another, it is necessary to cause the condensed point, namely, the focus of the light beam from the laser light source to coincide the information recording surface of each disk, by shifting the position of the objective lens in the focusing direction.

In addition, such disks having a poor mechanical characteristics which causes a large surface swing of the optical disk medium, or has a large eccentricity or tilt of the optical disk medium, start to appear with popularization of use of optical disks.

In order to obtain a good characteristics of information recording, reproducing and erasing for those various optical disk media, an objective lens driving device has become necessary, which can easily realize the tilt control, with less variation in a tilt movement sensitivity or a tilt movement linearity, even in the condition that the objective lens has been shifted in the focusing direction or in the tracking direction.

Under the above mentioned circumstance, recently, an objective lens driving device has become strongly demanded, which can drive the objective lens in three directions of the focusing direction, the tracking direction and the radial tilt direction, and which has less variation in a tilt movement sensitivity or a tilt movement linearity even if the objective lens has been shifted in the focusing direction or in the tracking direction, and which has a minimized size in a radial direction.

One example of objective lens driving devices capable of compensating the radial tilt of the optical disk medium is disclosed in Japanese Patent Application Pre-examination Publication No. JP-A-09-231595, entitled "LENS ACTUATOR WITH TILT CORRECTION".

Figure 9:
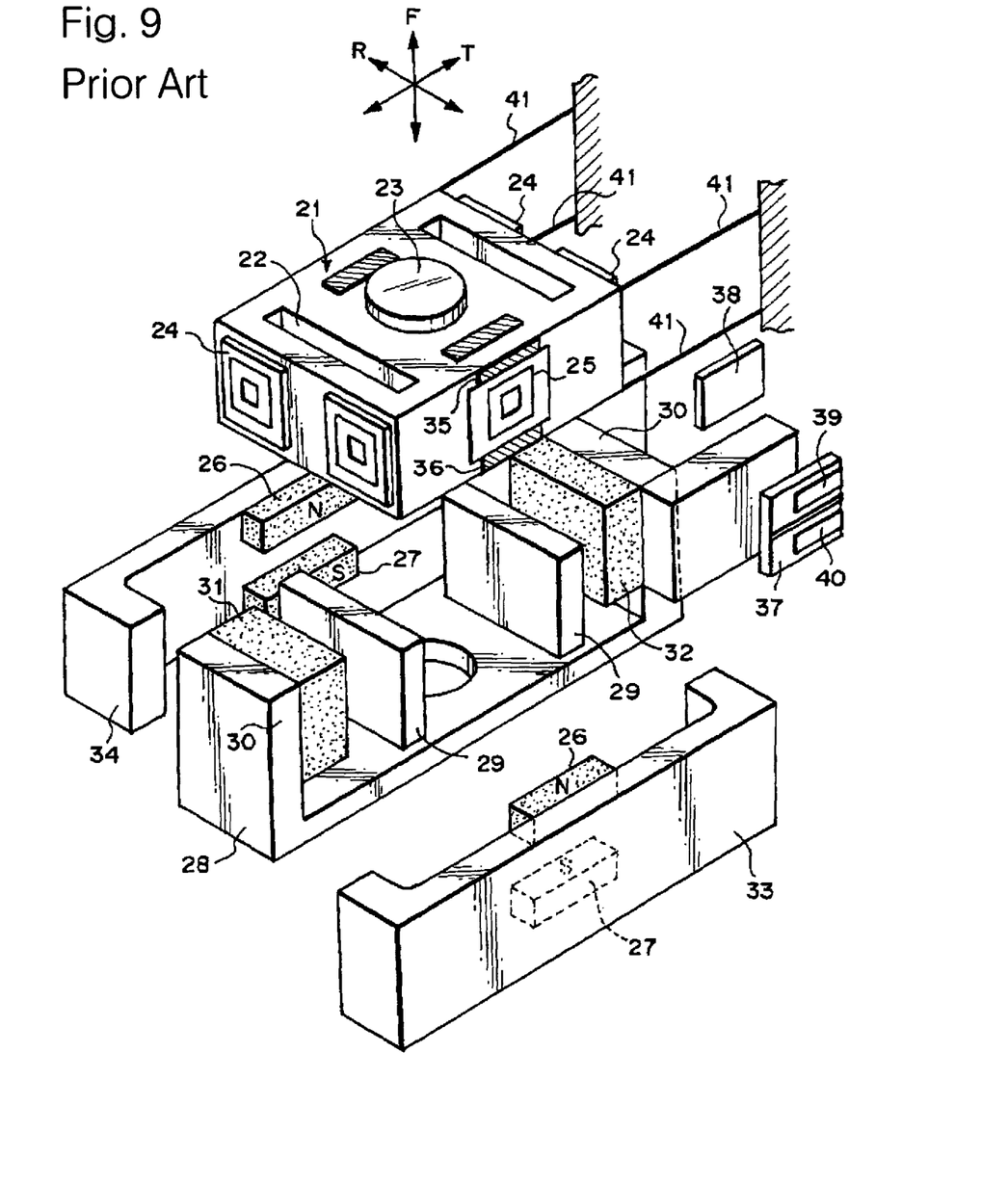
FIG. 9 is a perspective view showing one example of a conventional objective lens driving device.

Namely, as shown in the exploded perspective view of FIG. 9, this lens actuator with tilt correction, includes tilt coils 25 provided on opposite side surfaces of an objective lens holder 21, respectively, and magnets 26 and 27 of opposite polarities provided at positions opposing each tilt coil 25, thereby to enable a tile movement of an objective lens 23 in the radial direction.

In brief, as shown in FIG. 9, the objective lens holder 21 has the objective lens 23 mounted at a center position thereof, and a pair of slits 22 formed at both sides of the objective lens 23. Driving systems for the lens actuator are shown by arrows designated by "F" (focusing axis), "R" (tracking axis) and "T" (tangent axis of the optical disk).

The objective lens holder 21 includes a pair of rectangular flat coils 24 provided on each of opposite side surfaces (four in total) for a tracking direction driving. As a coil for the tilt correction, the rectangular flat coils 25 are provided on opposite side surfaces in an optical disk radial direction (R). In addition, the elongated magnets 26 and 27 of opposite polarities to each other are provided on each of side yokes 33 and 34, which will be explained hereinafter, at positions corresponding to an upper side and a lower side of the rectangular flat coil 25.

For a magnetic circuit of the lens actuator, the yokes 33 and 34 are abutted to an actuator base 28 so that a substantially closed magnetic circuit is constituted by magnets 31 and 32, for the driving in the focusing direction and in the tracking direction.

On opposite side surfaces of the actuator base 28, there are provided the side yokes 33 and 34 of a C-shape in a plan view, for a tilt adjustment driving of the lens holder. The above mentioned magnets 26 and 27 are bonded to the side yokes 26 and 27.

Incidentally, a printed circuit board (not shown) is bonded to the objective lens holder 21 through copper foil portions 35 and 36 so that the printed circuit board is supported.

Similarly, rectangular printed circuit boards 37 and 38 are bonded to the actuator base 28 through copper foil portions 39 and 40. Four spring wires 41 made of phosphor bronze are fixed to the printed circuit boards located at opposite ends of the spring wires, thereby resiliently supporting the objective lens holder 21.

This lens actuator is driven in such a manner that an electric current is supplied to the pair of rectangular flat coils 25 in the same direction, so that the generated magnetic fields are in bilateral symmetry, with the result that the magnetic driving forces of the respective coils have different directions at opposite sides of the objective lens holder 21 under the Fleming's left hand rule, to rotate the objective lens holder 21 around its center of gravity or a center point of support, thereby to be enable the tilt correction of the optical disk (not shown).

In the above mentioned conventional objective lens driving device, in the condition that the objective lens has been shifted in the tracking direction or in the focusing direction, no attention has been paid for ensuring the sensitivity and the linearity of the tilt movement in the radial direction. When the objective lens has been shifted in the tracking direction or in the focusing direction, the sensitivity and the linearity of the tilt movement change from those when the objective lens is in its neutral position, with the result that it is not possible to stably control the objective lens to a desired position, and therefore, the characteristics of the information recording, reproducing and erasing become deteriorated.

Furthermore, the objective lens driving device has a large size in the radial direction because the tilt coils provided at the side surfaces of the lens holder and the tilt magnets provided at the surfaces opposing the tilt coils, so that an accessible range to a center portion area of the optical disk medium is restricted, with the result that it is not possible to access an innermost recording area of the optical disk.

With an increased data transfer rate, the number of revolution of the optical disk medium has the tendency of increasing. When a primary resonance frequency in the tilt direction becomes coincident with a rotational frequency of the optical disk medium, a rolling mode resonance phenomenon will occurs.

BRIEF SUMMARY OF THE INVENTION

Accordingly, it is an object of the present invention to provide an objective lens driving device which has overcome the above mentioned problems of the prior art.

Another object of the present invention is to provide an objective lens driving device capable of realizing a stable tile control of the objective lens so as to obtain a good characteristics of information recording, reproducing and erasing, for an optical disk having a large surface swing or eccentricity of the optical disk medium, or for each of optical disks having different disk thicknesses thereby to have different optimum focal points, or even if the objective lens has been shifted in the tracking direction or in the focusing direction.

Still another object of the present invention is to provide an objective lens driving device having a minimized size in the radial direction and an increased accessible area for the optical disk.

In order to achieved the above mentioned objects of the present invention, according to the present invention there is provided an objective lens driving device comprising:

a lens holder including an objective lens for condensing a light emanated from a light source onto an optical disk medium, a focusing coil for driving the objective lens in a light axis direction, a tracking coil for driving the objective lens in a radial direction, and tilt coils for driving the objective lens in a rotational direction within a plane including two axes of the light axis direction and the radial direction;

a fixed block for supporting the lens holder by supporting members of supporting the lens holder;

focusing and tracking magnets for generating an electromagnetic force acting on the focusing coil and the tracking coil;

tilt magnets for generating an electromagnetic force acting on the tilt coils;

wherein the tilt coils are wound in a multilayer and has an inner peripheral shape of a substantial rectangle, the tilt coils being mounted on opposite side surfaces of the lens holder in the radial direction, wherein the tilt magnets are located to put the lens holder between the tilt magnets in the radial direction and to oppose to the tilt coils, respectively, each of the tilt magnets being divided into two parts in a direction parallel to the light axis direction, the two parts being magnetized to have different polarities in the radial direction, respectively, and wherein when the lens holder is in a neutral position, a ratio of a gap between opposing surfaces of one tilt magnet and one tilt coil which oppose to each other, to a radial direction thickness of the tile magnet, is in the range of 1/1.5 to 1/3.

According to the present invention, in at least one tilt coil of the tilt coils, a ratio of a light axis direction inside distance of the tilt coil to a light axis direction height of the tilt magnet, is in the range of 1/2 to 1/4.

Furthermore, according to the present invention, the tilt magnets are formed of rare earth material.

In addition, according to the present invention, of the two tilt magnets, the tilt magnet located at a center side portion of the optical disk medium is smaller in size than the tilt magnet located at a periphery side portion of the optical disk medium, or alternatively is omitted.

Moreover, according to the present invention, there is provided an objective lens driving device comprising:

a lens holder including an objective lens for condensing a light emanated from a light source onto an optical disk medium, a focusing coil for driving the objective lens in a light axis direction, a tracking coil for driving the objective lens in a radial direction, and tilt coils for driving the objective lens in a rotational direction within a plane including two axes of the light axis direction and the radial direction;

a fixed block for supporting the lens holder by supporting members of supporting the lens holder;

focusing and tracking magnets for generating an electromagnetic force acting on the focusing coil and the tracking coil;

tilt magnets for generating an electromagnetic force acting on the tilt coils;

wherein the tilt coils are wound in a multilayer and has an inner peripheral shape of a substantial rectangle, the tilt coils being mounted on opposite side surfaces of the lens holder in the radial direction, wherein the tilt magnets are located to put the lens holder between the tilt magnets in the radial direction and to oppose to the tilt coils, respectively, the light axis direction height of the tilt magnets being lower than a center portion of the tile coils in the form of the substantial rectangle, the tilt magnets being magnetized to have only one polarity in the radial direction, and wherein when the lens holder is in a neutral position, a ratio of a gap between opposing surfaces of one tilt magnet and one tilt coil which oppose to each other, to a radial direction thickness of the tile magnet, is in the range of 1/1.5 to 1/3.

Furthermore, according to the present invention, a radial direction spacing of mounting positions of the supporting members to the fixed block is longer than a radial direction spacing of mounting positions of the supporting members to the lens holder.

EMBODIMENTS

Figure 1A:
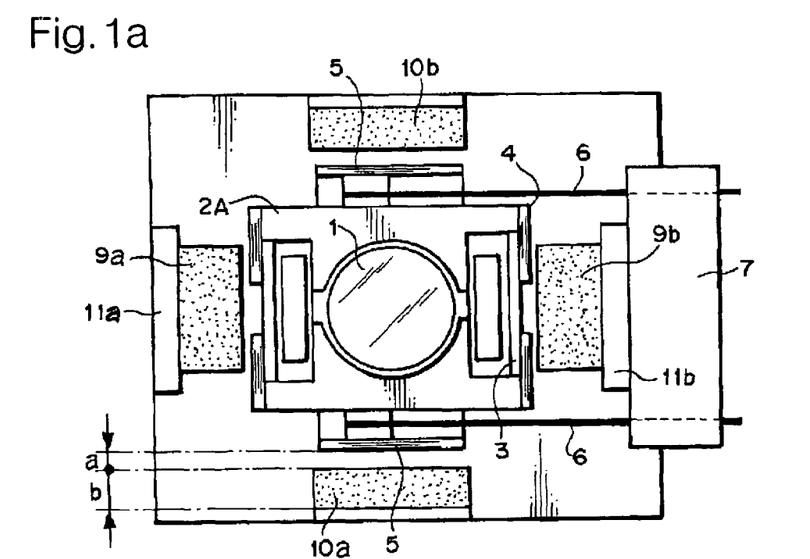
FIGS. 1a and 1b are a plan view and a perspective view illustrating a first embodiment of the objective lens driving device in accordance with the present invention.
Figure 1B:
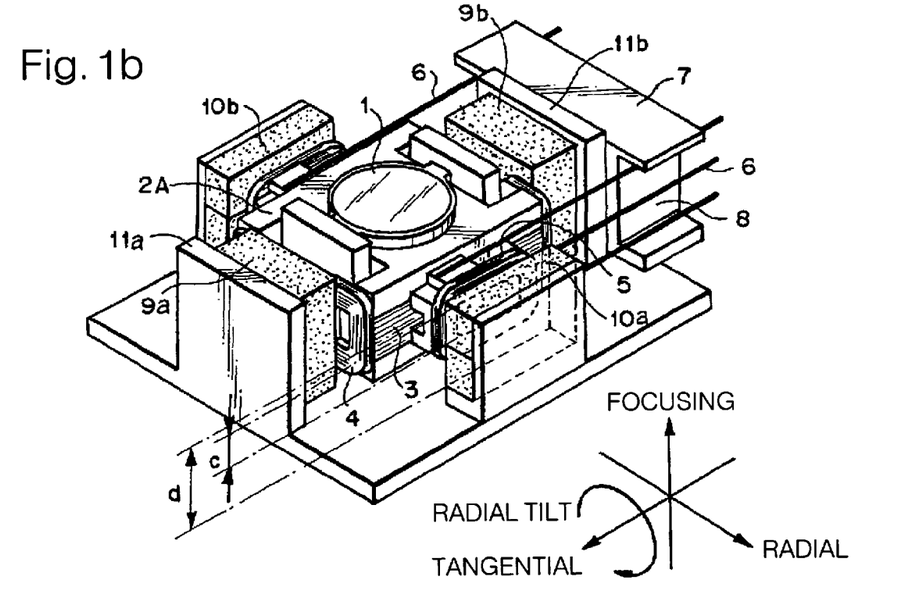

Now, a first embodiment of the objective lens driving device in accordance with the present invention will be described in detail with reference to the drawings. FIGS. 1a and 1b illustrate the first embodiment of the objective lens driving device in accordance with the present invention, FIG. 1a being a plan view and FIG. 1b being a perspective view.

As shown in FIGS. 1a and 1b, an objective lens 1 for condensing a light generated from a light source onto an information recording surface of an optical disk medium, is mounted to a lens holder 2A. This lens holder 2A is cantilevered by six supporting members 6 in the form of a wire, which are fixed at their one end to a fixed block 7, so that the lens holder 2A are displaceable in each direction of a focusing direction, a tracking direction and a radial tilt direction. Incidentally, the lens holder 2A can be supported from opposite sides. In addition, the supporting member can be constituted of for example, a leaf spring, in place of the wiring spring.

The lens holder 2A are provided with a focusing coil 3, tracking coils 4 and tilt coils 5, which generate a thrust force to drive the objective lens 1 in each direction of the focusing direction, the tracking direction and the radial tilt direction, thereby to cause the objective lens 1 to follow variation in a surface swing, a eccentricity, and a cambering of the optical disk medium.

Magnets 9a and 9b for generating a magnetic field to produce an electromagnetic force acting on the focusing coil 3 and the tracking coils 4 of these coils, are located in bilateral symmetry to put the focusing coil 3 and the tracking coils 4 between the magnets 9a and 9b. Furthermore, behind these magnets 9a and 9b, yokes 11a and 11b are located to raise the distribution efficiency of the magnetic field strength. In addition, an arrangement with no yoke can be adopted. Moreover, another arrangement in which the tracking coil 4 is wound around the optical axis and the tangential direction of the lens holder can be adopted.

Here, the tilt coils 5 and the tilt magnets 10a and 10b for driving the objective lens 1 in the radial tilt direction are constituted as follows.

The tilt coils 5 are a coil wound in a multi-layer having an inner peripheral shape of a substantial rectangle or square, and are arranged in the opposite side surfaces of the lens-holder 2A in the radial direction. In addition, it is possible to adopt a configuration which the portion of the tilt coils extending in parallel with the optical axis direction is folded toward to the objective lens side.

Since the tilt magnets 10a and 10b generate the required magnetic field to produce an electromagnetic force acting on the tilt coil 5, the tilt magnets 10a and 10b are located at an outside of the tilt coils 5 to put the both side surfaces of the lens holder 2A between the tilt magnets 10a and 10b in the radial direction. Each of the tilt magnets 10a and 10b is magnetized to have two different polarities in the radial direction in such a manner that each tilt magnet is divided into two magnet parts at its center portion in the optical axis direction and the upper and lower magnet parts have different polarities in the radial direction.

Incidentally, in place of one magnet, each tilt magnet can be formed of a combination of two magnets stacked in the vertical direction. In addition, the two magnets can be separated by a gap. It is possible to minimize the size of the magnet if the magnet can be formed of a material including the rare earth such as neodymium as a principal component, in order to increase the generated magnetic field strength.

Figure 2:
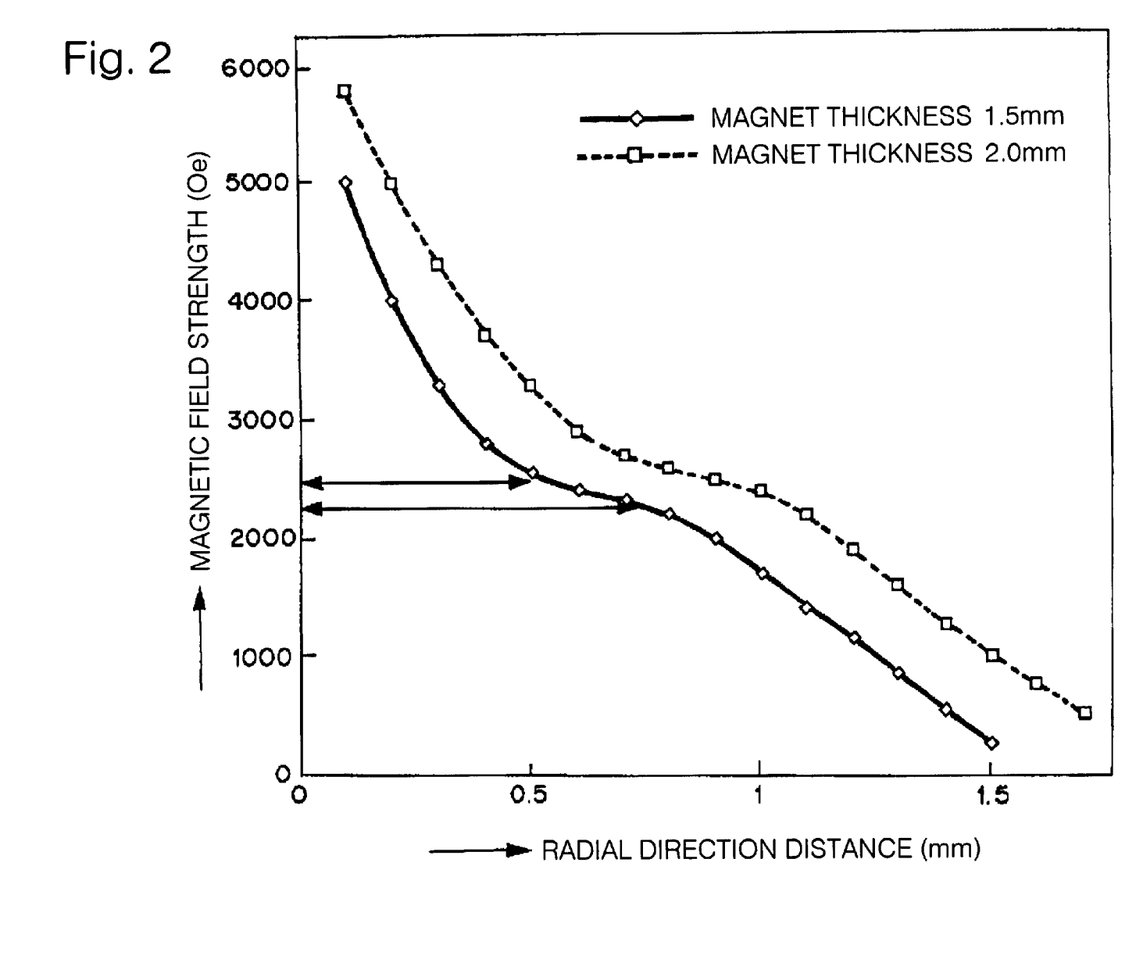
FIG. 2 is a graph illustrating a distribution of magnetic field strength of a radial component in the radial direction, generated by the tilt magnets, for illustrating an operation of the first embodiment of the objective lens driving device in accordance with the present invention.

In order to verify the intensity distribution of the magnetic field more concretely, the inventor prepared, as one example, the tilt magnets 10a and 10b, which were formed of the rare earth including neodymium a principal component and having the energy product of about 48 MGOes and which have the thickness of 1.5 mm, the height of 4.0 mm, and the width of 6.0 mm. The inventor tested and measured the strength of the radial direction component of the magnetic field generated by the magnet, at a position in the radial direction from a substantial center portion of the low magnet part of the magnet halved in the vertical direction. FIG. 2 shows the result of the measurement.

As seen from the graph of FIG. 2, the nearer the measurement point becomes to the tilt magnet, the larger the strength of the magnetic field becomes. However, with a slight displacement in a radial direction, the strength of the magnetic field greatly changes. On the other hand, the remoter the measurement point becomes from the tilt magnet, the change in the strength of the magnetic field becomes small, but the strength of the magnetic field lowers relatively.

Then, when the objective lens 1 is its neutral position in which the lens holder 2A is held by the supporting members 6 in the condition of a substantially straight line, it was configured that the distance between the surface of the tilt coil 5 and the surface of the tilt magnets 10a and 10b, namely, the gap (a) shown in FIG. 1a is on the order of 1/3 to 1/1.5 of the radial direction thickness (b) of the tilt magnets 10a and 10b.

Namely, if the ratio of a/b is in the range of 1/1.5 to 1/3, it is possible to operate the tilt coil 5 in a region in which the magnetic field strength in the radial direction is substantially uniform, as shown by arrows in FIG. 2. This means that even if the objective lens is shifted in the radial direction, it is possible to minimize the variation in the sensitivity and the linearity of the tilt movement.

Incidentally, if the ratio of a/b is out of the range of 1/1.5 to 1/3, as seen from the graph of FIG. 2, the force for the tilt movement is obtained in the region in which the magnetic field strength greatly changes, with the result that when the objective lens is shifted so that the gap changes, the sensitivity or the linearity of the tilt movement varies, and therefore, a stable characteristics of recording, erasing and reproducing cannot be obtained.

This is applied even if the radial direction thickness of the tilt magnets 10a and 10b is changed. This is shown in a dotted line in the graph of FIG. 2. The dotted line illustrates an example of the change of the radial direction component of the magnetic field strength when the radial direction thickness of the tilt magnets 10a and 10b is 2 mm, in a manner similar to the example shown by the solid line.

As shown in this graph, a substantial proportional relation can hold between the thickness of the tilt magnets 10a and 10b and the region in which the magnetic field strength in the radial direction is substantially uniform. Therefore, even if the thickness of the tilt magnets 10a and 10b is changed, if the ratio of a/b is in the range of 1/1.5 to 1/3, it is possible to minimize the variation in the sensitivity and the linearity of the tilt movement even if the objective lens 1 is shifted in the radial direction.

Figure 3:
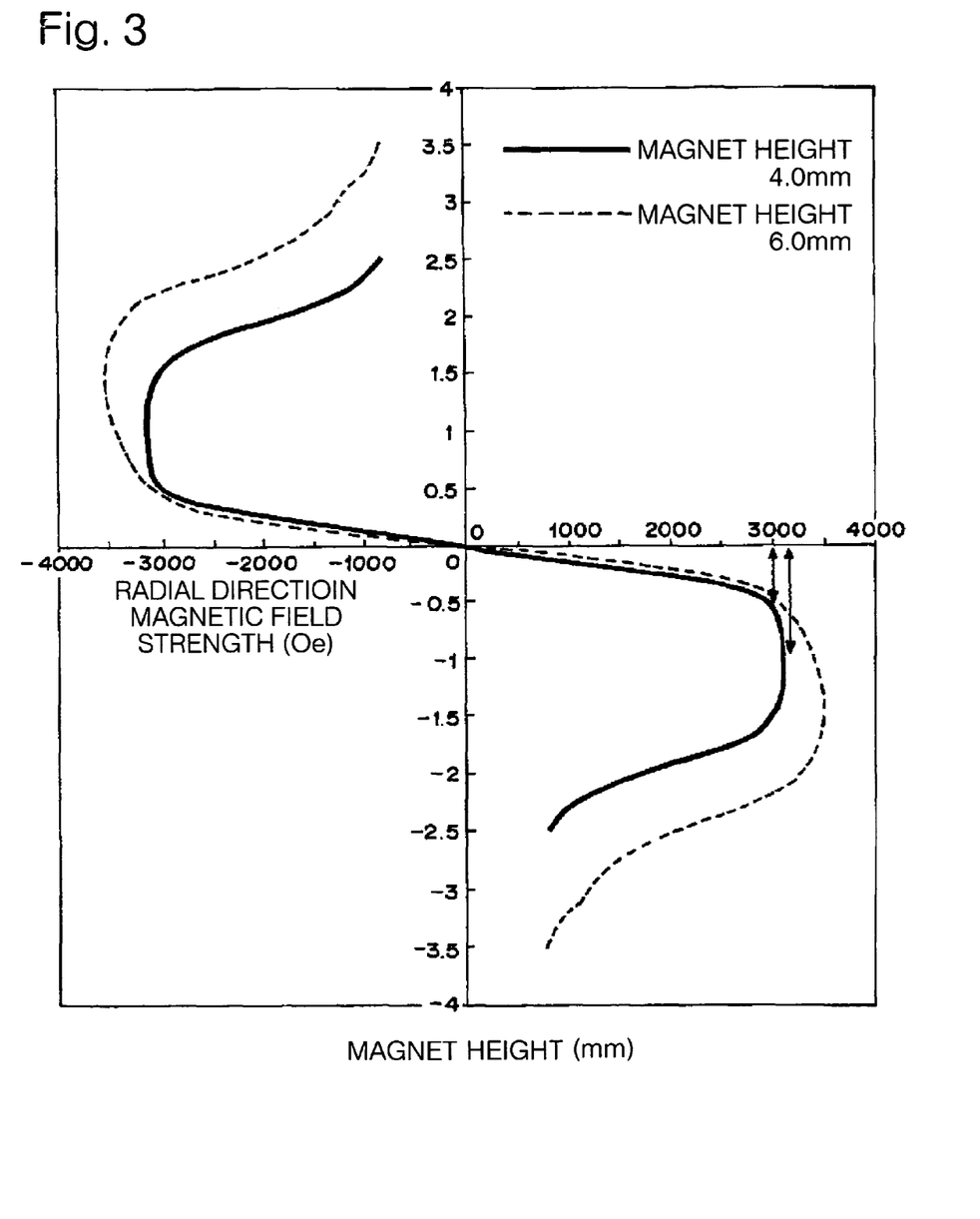
FIG. 3 is a graph illustrating a distribution of magnetic field strength of a radial component in the height direction, generated by the tilt magnets, for illustrating a different operation of the first embodiment of the objective lens driving device in accordance with the present invention.
Figure 4A:
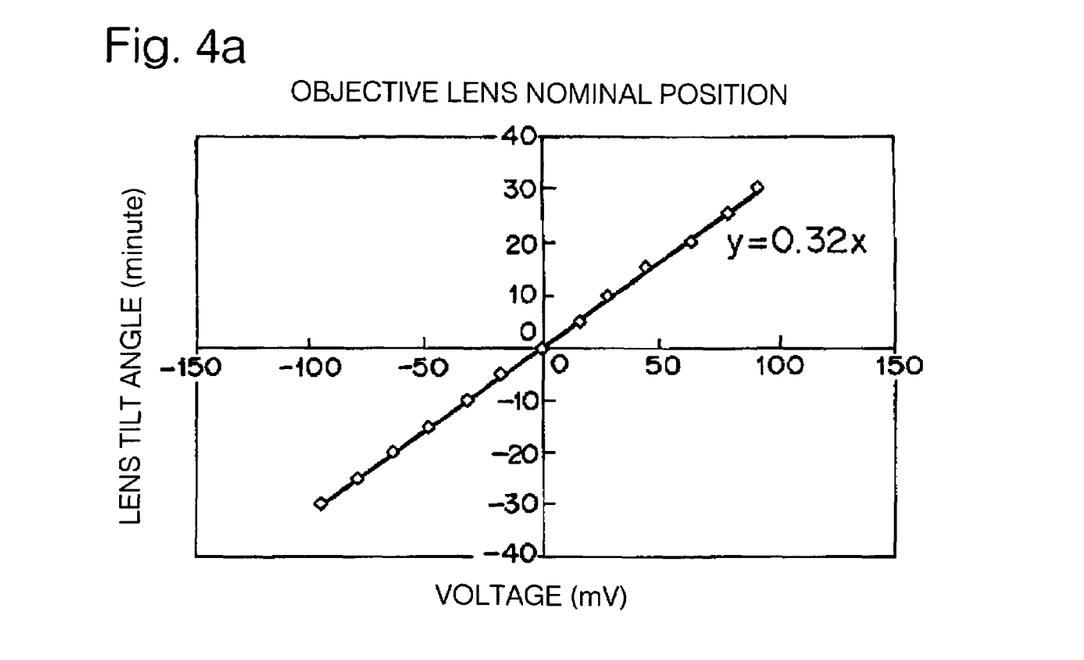
FIGS. 4a and 4b are graphs for showing the measured result of the relation between the voltage applied to the tilt coil and the tilt sensitivity when the objective lens in the first embodiment of the objective lens driving device in accordance with the present invention was moved from its nominal position in the tracking direction, FIG. 4a showing the relation when the objective lens is in the nominal position, and FIG. 4b showing the relation when the objective lens has been moved to one direction of the tracking direction.
Figure 4B:
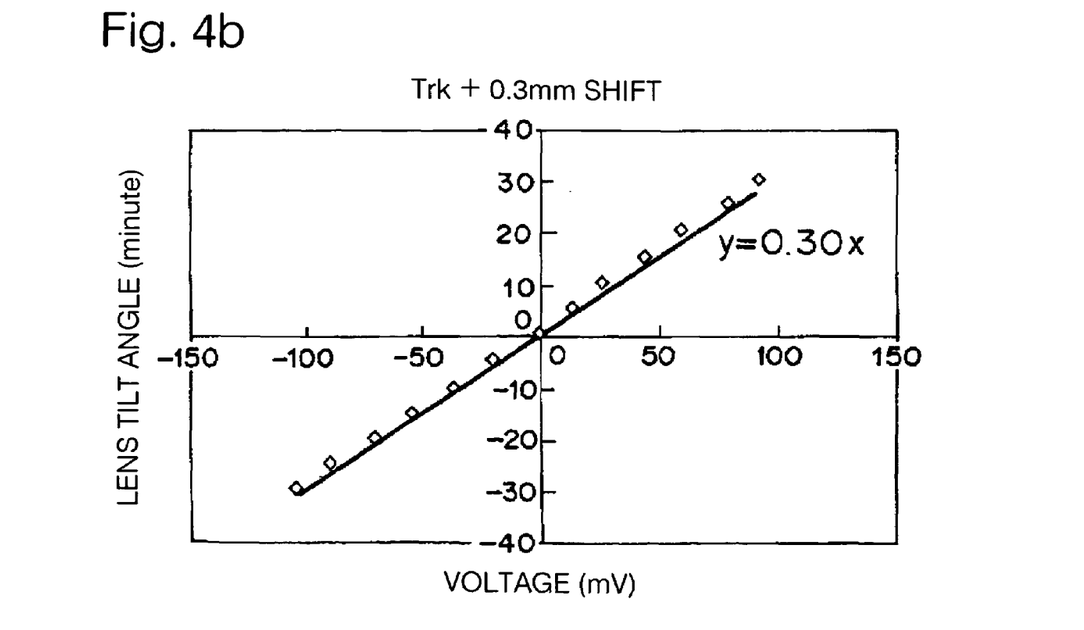
Figure 5A:
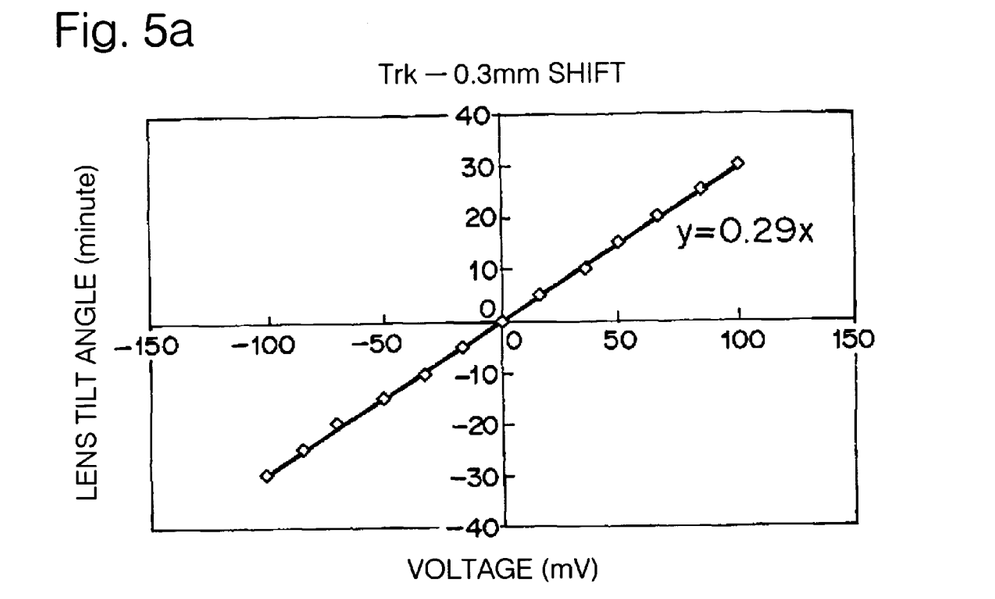
FIGS. 5a and 5b are graphs for showing the measured result of the relation between the voltage applied to the tilt coil and the tilt sensitivity when the objective lens in the first embodiment of the objective lens driving device in accordance with the present invention was moved from its nominal position to the other direction of the tracking direction and to one direction of the focusing direction, FIG. 5a showing the relation when the objective lens has been moved the other direction of the tracking direction, and FIG. 5b showing the relation when the objective lens has been moved to one direction of the focusing direction.
Figure 5B:
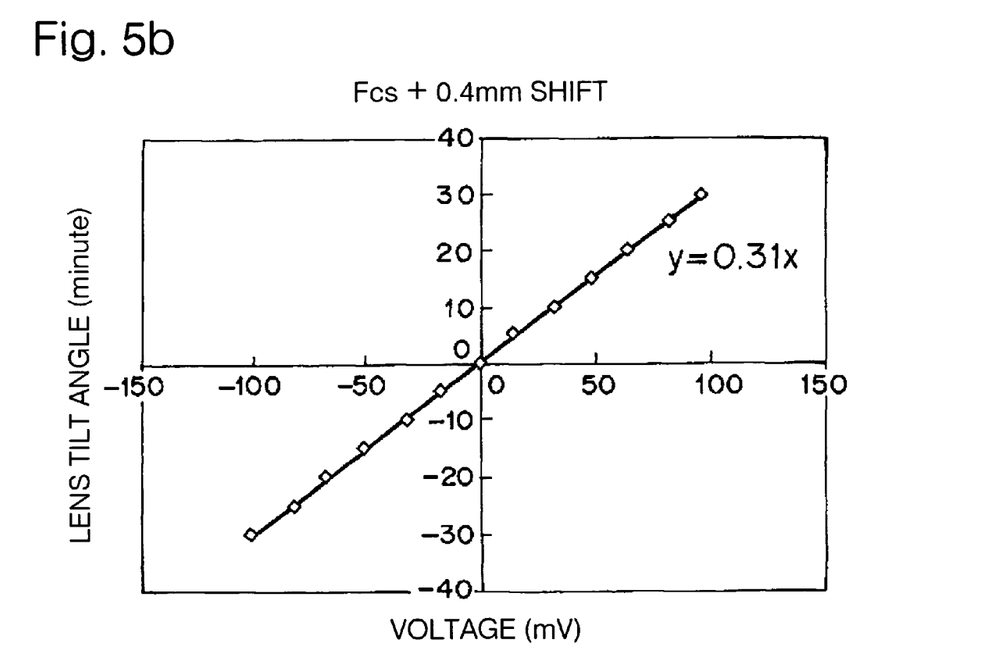
Figure 6:
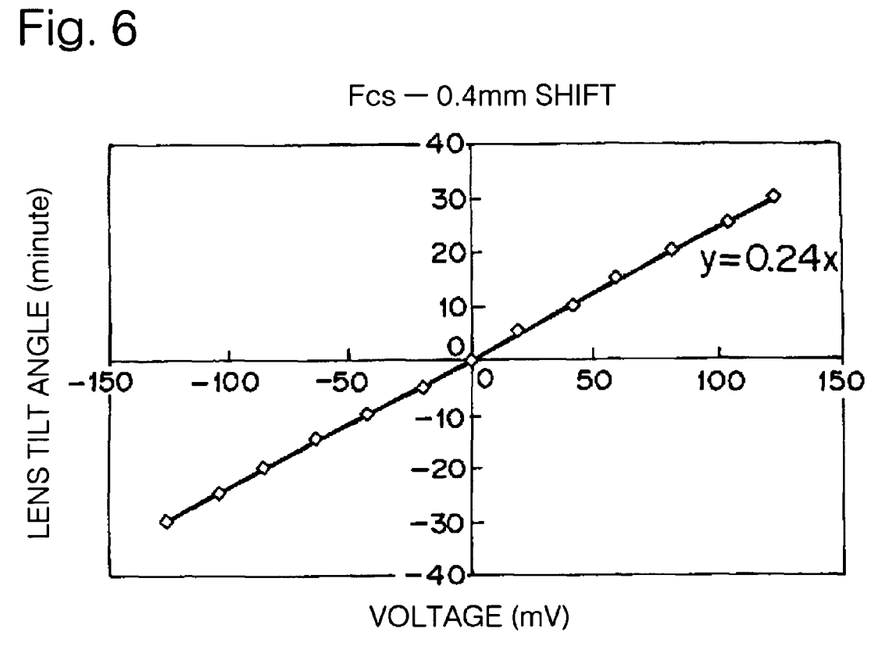
FIG. 6 is a graph for showing the measured result of the relation between the voltage applied to the tilt coil and the tilt sensitivity when the objective lens in the first embodiment of the objective lens driving device in accordance with the present invention was moved from its nominal position to the other direction of the focusing direction.

When the tilt magnets 10a and 10b formed of the above mentioned material to have the above mentioned size are positioned in such a manner that the ratio of the gap (a) between the tilt magnets 10a and 10b and the tilt coil 5 to the thickness (b) of the tile magnet 10 is substantially in the range of 1/1.5 to 1/3, the focusing direction distribution of the radial direction magnetic field strength of the tilt magnets 10a and 10b is shown by a solid line in the graph of FIG. 3.

As seen from FIG. 3, the radial direction magnetic field strength generated by the tilt magnets which were magnetized to have two polarities in the radial direction but separated in the vertical direction, greatly changes in a center portion of the magnet since the polarity inverts at the center portion of the magnet, and becomes substantially zero at the center portion of the magnet. In addition, nearer it becomes to the upper edge of the upper part or to the lower edge of the lower part, the radial direction magnetic field strength gradually lowers, and in a center portion of each of the upper part and the lower part, there is a region in which the magnetic field strength is substantially uniform.

This inclination is true even if the height of the magnet is changed. A dotted line in the graph of FIG. 3 illustrates the distribution of the radial direction magnetic field strength when the magnet height is 6 mm. As seen from this graph, a substantial proportional relation can hold between the height of the tilt magnets and the region in which the magnetic field strength is substantially uniform.

Assuming that an inside distance in the focusing direction of an inner peripheral edge of a substantial rectangle or square where the tilt coil 5 starts to be wound is "c" and the height of the tilt magnets 10a and 10b is "d", if the ratio of c/d is in the range of 1/2 to 1/4, it is possible to utilize a region in which the change in the radial direction magnetic field strength is small, as shown in the range indicated by two arrows in FIG. 3.

Therefore, even if the objective lens is shifted in the focusing direction, it is possible to minimize the variation in the sensitivity and the linearity of the tilt movement, and it is also possible to minimize the outer size of the coil by defining the position of the winding start point as mentioned above.

Incidentally, if the ratio of c/d is out of the range of 1/2 to 1/4, as seen from the graph of FIG. 3, the force for the tilt movement is obtained in the region in which the magnetic field strength greatly changes, with the result that when the objective lens is shifted, the sensitivity or the linearity of the tilt movement changes, and therefore, it is evident that a stable characteristics of recording, erasing and reproducing can no longer be obtained.

In addition, in the case that each tilt magnet is constituted of two magnets arranged in the vertical direction, with a gap being left between the two magnets, it is sufficient if the ratio is compensated by the amount corresponding to the magnitude of the gap. Namely, it is sufficient if the ratio is compensated to a value which is smaller than 1/2 by the magnitude of the gap.

In the above mentioned embodiment, there was prepared an objective lens driving device in which the tilt magnets 10a and 10b were formed of the rare earth including neodymium a principal component and having the energy product of about 48 MGOes and which have the thickness of 1.5 mm, the height of 4.0 mm, and the width of 6.0 mm, in which the inside distance in the focusing direction of the coil winding shape of the tilt coil 5 in the form of a rectangle elongated in the tangential direction or a square, is 1.6 mm, and in which the gap is 0.75 mm so that a/b=1/2 and c/d=1/2.5, the graphs of FIGS. 4a, 4b, 5a, 5b and 6 illustrate the measured result of the change in the sensitivity and the linearity of the tilt movement, when the objective lens was in the nominal position, when the objective lens was moved from its nominal position to the tracking direction of ±0.3 mm, and when the objective lens was moved from its nominal position to the focusing direction of ±0.4 mm, the sensitivity of the tilt movement being represented by the tilt changing amount of the objective lens in relation to the voltage applied to the tilt coil.

From the measured result shown in these graphs, even if the objective lens 1 is shifted in the tracking direction or in the focusing direction, the variation amount of the tilt sensitivity is slight, and therefore, it is possible to sufficiently ensure the linearity. Namely, validity of the present invention can be confirmed.

Now, a radial tilt movement of the objective lens 1 in which a center side tilt magnet 10b of the tilt magnets 10a and 10b is reduced in size to have the thickness thinner than that of the periphery side tilt magnet 10a or alternatively is omitted, will be described with FIG. 7a and FIG. 7b.

Figure 7A:
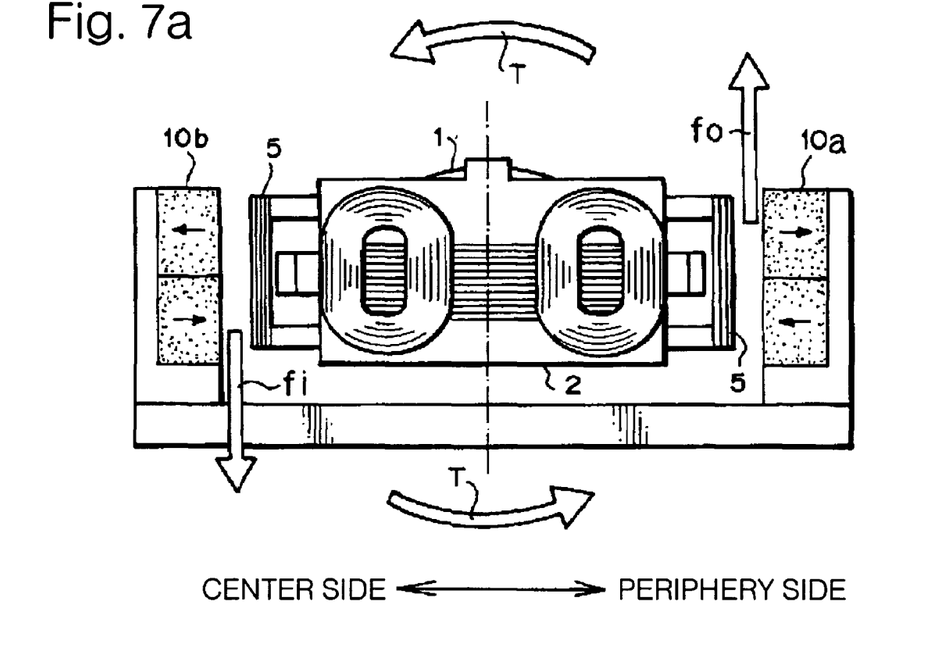
FIG. 7a illustrates a principle of a tilt movement when the two tilt magnets in the first embodiment of the objective lens driving device in accordance with the present invention have the same standard.

FIG. 7a illustrates a principle of a tilt movement when the two tilt magnets have the same outer shape and size in the first embodiment of the objective lens driving device as shown in FIGS. 1a and 1b. FIG. 7b illustrates a principle of a tilt movement when the tilt magnet 10b is made smaller than the tilt magnet 10a similarly in the first embodiment of the objective lens driving device.

When the tilt magnet 10a and the tilt magnet 10b have the same outer shape and size, as shown in FIG. 7a, when the lens holder 2A is viewed from the tangential direction, the torque T which is a thrust for the radial tilt movement is a synthesization of thrust forces "fi" and "of" having different directions, which are generated by cooperation of the tilt coils 5 and the tilt magnets 10a and 10b which are located at opposite sides of the lens holder 2A in bilateral symmetry. The objective lens 1 causes the radial tilt around a center of the lens holder 2A.

Figure 7B:
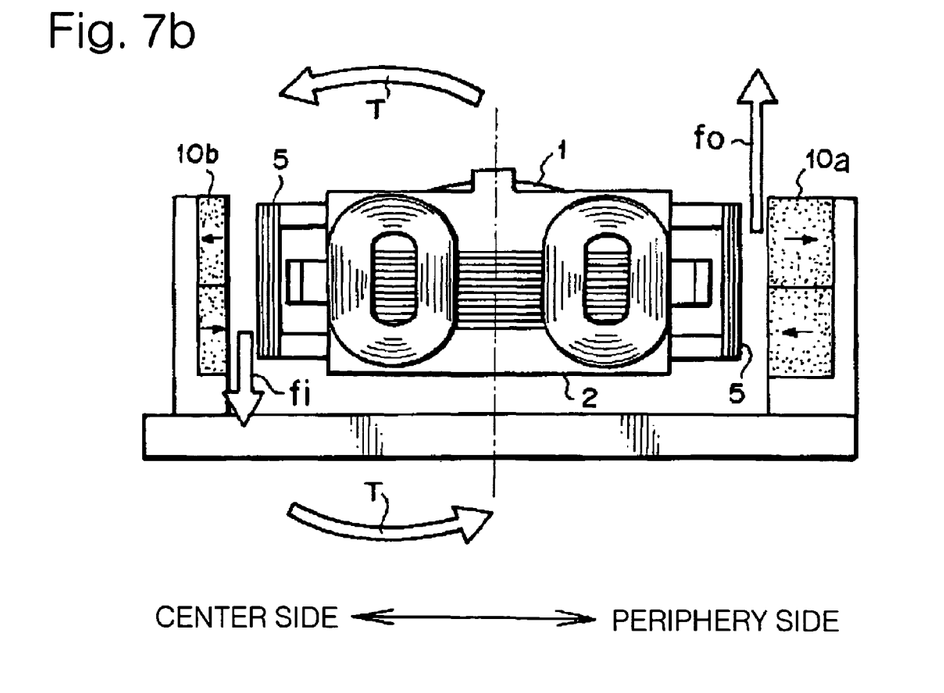
FIG. 7b illustrates a principle of a tilt movement when a center side tilt magnet of the two tilt magnets in the first embodiment of the objective lens driving device in accordance with the present invention has a small size.

On the other hand, when the tilt magnet 10b located at the center side of the optical disk medium is reduced in size to have a thinner thickness or alternatively is omitted, as shown in FIG. 7b, the center side thrust "fi" and the periphery side thrust "fo" are in bilateral asymmetry with respect with the center of the lens holder 2A. As a result, the value of the torque T which is the thrust for the radial tilt movement becomes small, and the position of the center of the rotation is shifted to the center side.

At this time, the tilt movement sensitivity lowers in comparison with the case that the tilt magnets 10a and 10b have the same outer shape and size. However, as mentioned above, since the tilt coil 5 is located in a region in which the radial direction magnetic field strength generated by the tilt magnet 10a is substantially uniform in order to generate the thrust for the tilt movement, even if the objective lens 1 is shifted in the focusing direction or in the tracking direction, the sensitivity or the linearity of the tilt movement does not greatly change, but only slightly changes from the value when the objective lens 1 is in the neutral position in which the lens holder 2A is held by the supporting member 6 in the condition of a substantially straight line.

In this case, the center of rotation of the radial tilt movement is shifted so that the position of the objective lens is shifted in the radial direction by the tilt movement. In this case, offset occurs in a tracking error signal, but with a tracking compensation based on the tracking error signal, it is possible to control the objective lens to a desired angle at a desired position.

In addition, it is possible to reduce not only the magnet but also the number of turns in the center side tilt coil which has reduced the contribution to the tilt driving force, or to omit the center side tilt coil. In this case, in order to prevent the weight balance of the lens bobbin from becoming greatly unbalanced, it is sufficient if a balancer is added.

As seen from the above, according to the arrangement of the present invention, even in the objective lens driving device in which the center side magnetic circuit for the tilt movement is reduced in size or omitted, the variation in the sensitivity and the linearity of the tilt movement is slight even if the objective lens is shifted in the focusing direction or in the tracking direction.

Figure 10:
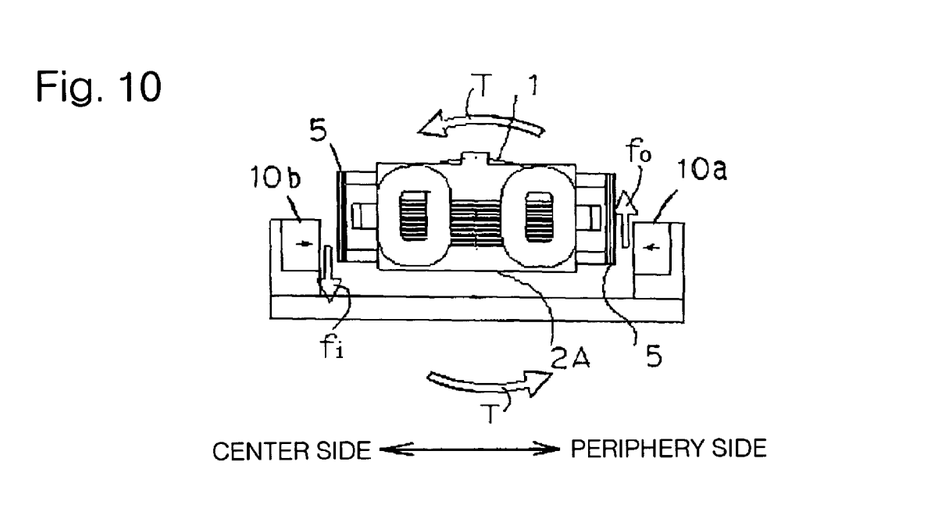
FIG. 10 illustrates a principle of a tilt movement when the two tilt magnets in the first embodiment of the objective lens driving device in accordance with the present invention have an optical axis direction height lower than a center position of the tilt coil, to have a small size, the tilt magnets being magnetized to have only one polarity in the radial direction.

Referring to FIG. 10, a radial tilt movement of the objective lens 1 will be described in a partially thinned objective lens driving device in which an optical axis direction height of the tilt magnets 10a and 10b is made lower than a center position of the tilt coil, in which the tilt magnets are magnetized to have only one polarity in the radial direction, and in which when the lens holder is in its neutral position, the ratio of the gap between opposing surfaces of the tilt magnet and the tilt coil to the radial direction thickness of the tilt magnet is in the range of 1/1.5 to 1/3.

In the case that the tilt magnets 10a and 10b have the height lower than the center position of the tilt coil 5 as shown in FIG. 10 and the tilt magnets are magnetized to have only one polarity in the radial direction, when the lens holder 2A is viewed from the tangential direction, the torque T which is a thrust for the radial tilt movement is a synthesization of thrust forces fi and fo having different directions, which are generated by cooperation of a lower portion in the optical axis direction of the tilt coils 5 and the tilt magnets 10a and 10b which are located at opposite sides of the lens holder 2A in bilateral symmetry. However, since the point for generating these thrust forces fi and fo is positioned at the lower portion of the tilt coils, the objective lens 1 causes the radial tilt movement around the point of rotation lower than the center of the lens holder 2A.

Here, when the ratio of the gap between opposing surfaces of the tilt magnet and the tilt coil to the radial direction thickness of the tilt magnet is in the range of 1/1.5 to 1/3, the magnetic field in the radial direction generated by the mono-polarity tilt magnet shown in FIG. 10 is about a half of the magnetic field generated by the double-polarity tilt magnet shown in FIG. 2, but the magnetic field strength distribution is not greatly different from that in the embodiment shown in FIG. 2. This is because no opposing yoke is provided. In the case of the double-polarity, since the magnetic field is circulated from one pole to the other pole, the strength of the magnetic field becomes relatively large. However, in the case of the mono-polarity, the generated magnetic field distributes radially uniformly.

In addition, similarly, the distribution of the radial direction strength in the optical axis direction at a gap position is broad around the tilt magnet from FIG. 3. Therefore, it is apparent that even if the objective lens is shifted in the focusing direction, the variation in the sensitivity and the linearity of the tilt movement is slight.

Accordingly, even if the optical direction height of the tilt magnets 10a and 10b is made lower than the center position of the tilt coils 5, and even if the tilt magnets are magnetized to have only one polarity in the radial direction, if the ratio of the gap between opposing surfaces of the tilt magnet and the tilt coil to the radial direction thickness of the tilt magnet is in the range of 1/1.5 to 1/3 when the lens holder is in the neutral position, the sensitivity or the linearity of the tilt movement does not greatly change from the value when the lens holder is in the neutral position where the lens holder 2A is held by the supporting member 6 in the condition of a substantially straight line, similarly to the above mentioned embodiments, even if the lens holder 1 is shifted in the focusing direction or in the tracking direction. Therefore, it is apparent that it is possible to minimize the variation of the sensitivity and the linearity.

As seen from the above, even in the objective lens driving device so configured that the optical direction height of the tilt magnets of the opposite sides (center side and the periphery side) is made lower than the center of the tilt coil, the variation in the sensitivity and the linearity of the tilt movement is slight when the objective lens is shifted in the focusing direction and in the tracking direction.

By adopting the above mentioned arrangement, the radial direction size of the objective lens driving device can be reduced or partially thinned, it is possible to prevent the objective lens driving device from interfering a spindle motor or a turntable which are located in the neighborhood of the center of the optical disk medium. Accordingly, it is possible to enlarge an accessible area at the center portion of the optical disk medium.

Figure 8A:
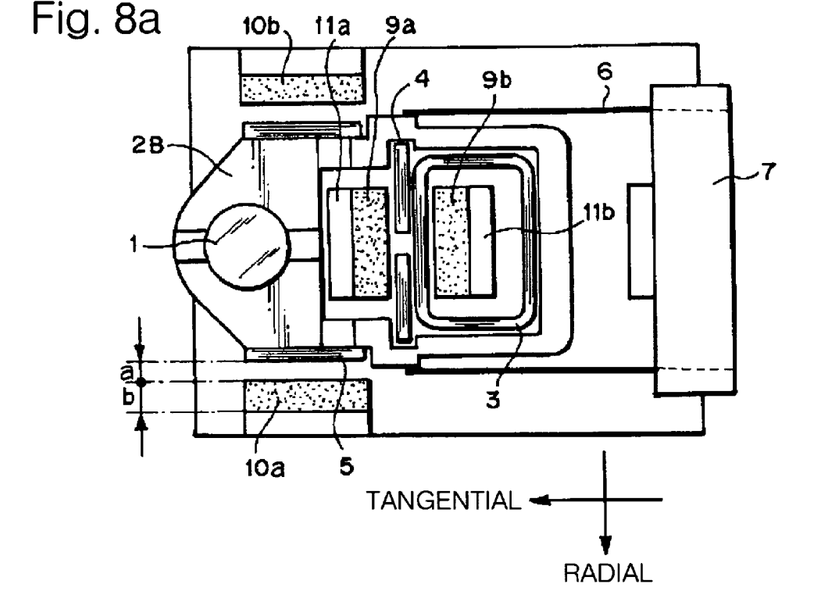
FIGS. 8a and 8b are a plan view and a perspective view illustrating a second embodiment of the objective lens driving device in accordance with the present invention.
Figure 8B:
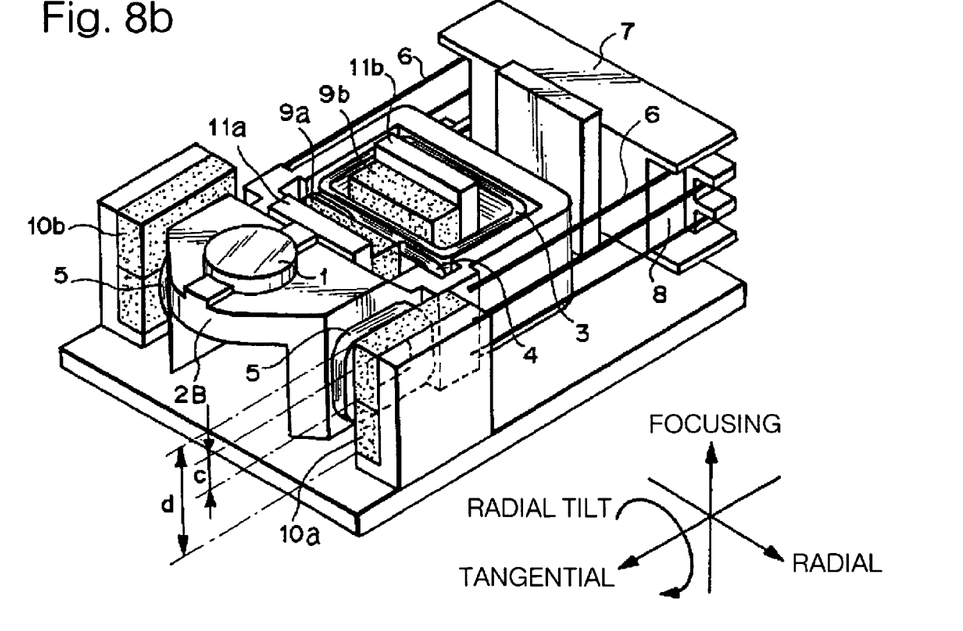

Now, a second embodiment of the objective lens driving device in accordance with the present invention will be described with reference to FIGS. 8a and 8b. FIG. 8a is a plan view and FIG. 8b is a perspective view.

In order to thin objective lens driving device, this objective lens driving device is so configured that the objective lens 1 is located out of the magnetic circuit constituted of magnets 9a and 9b and yokes 11a and 11b for the focusing and the tracking. Thus, it is possible to locate an optical parts such a vertically guiding mirror, below the objective lens 1, whereby it is possible to thin the optical disk apparatus.

In this case, the tilt coils 5 are located at opposite sides of a lens holder 2B respectively, on an extension in the tangenial direction of the supporting member 6 fixed to lens holder 2B.

In this embodiment, similarly to the first embodiment mentioned above, the ratio of the distance between opposing surfaces of the tilt coils 5 and the tilt magnets 10a and 10b, namely, the gap "a" in FIG. 8a, to the radial direction thickness "b" of the tilt magnet 10a, is in the range of 1/3 to 1/2 when the lens holder 2B is held by the supporting member 6 in the condition of a substantially straight line. Namely, a/b is in the range of 1/3 to 1/2.

Furthermore, the ratio of the inside distance "c" in the focusing direction of an inner peripheral edge of a substantial rectangle or square where the tilt coil 5 starts to be wound, to the height "d" of the tilt magnets 10a and 10b is "d", in the range of 1/2 to 1/4. Namely, the ratio of c/d is in the range of 1/2 to 1/4.

In addition, the tilt magnets 10a and 10b are formed of a rare earth material, and are magnetized to have two polarities at the surface opposing the tilt coil 5.

When the thinned objective lens driving device as shown in FIGS. 8A and 8B is configured as mentioned above, it is possible to obtain the tilt sensitivity characteristics, similar to that of the first embodiment mentioned above.

Furthermore, when the tilt magnet 10b (of the tilt magnets 10a and 10b) located at the center side of the optical disk medium is formed to have the thickness thinner than that of the periphery side tilt magnet 10a or alternatively is omitted, or when the center side and periphery side tilt magnets 10a and 10b are configured to have the height lower than the center of the tilt coil 5 and the tilt magnets are magnetized to have only one polarity in the radial direction, the tilt movement can be realized similarly to the first embodiment. Even if the objective lens is shifted in the focusing direction or the tracking direction, the variation in the sensitivity and the linearity of the tilt movement is slight, and simultaneously, it is possible to reduce the objective lens driving device in the radial direction, so that the accessible area in the center side of the optical disk medium can be enlarged.

Now, a third embodiment of the objective lens driving device in accordance with the present invention will be described with reference to FIG. 11.

Figure 11:
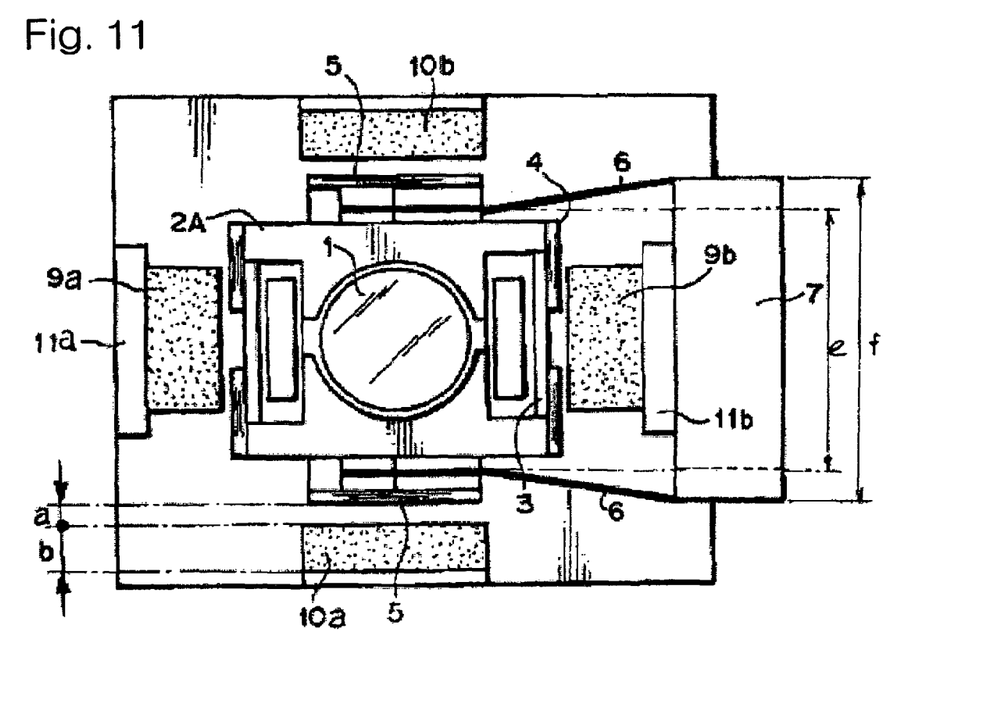
FIG. 11 is a plan view illustrating a third embodiment of the objective lens driving device in accordance with the present invention.

As shown in FIG. 11, a radial direction spacing "e" between mounting positions of the supporting members 6 to the lens holder 2A, is longer than a radial direction spacing "f" between mounting positions of the supporting members 6 to the fixed block 7.

Figure 12:
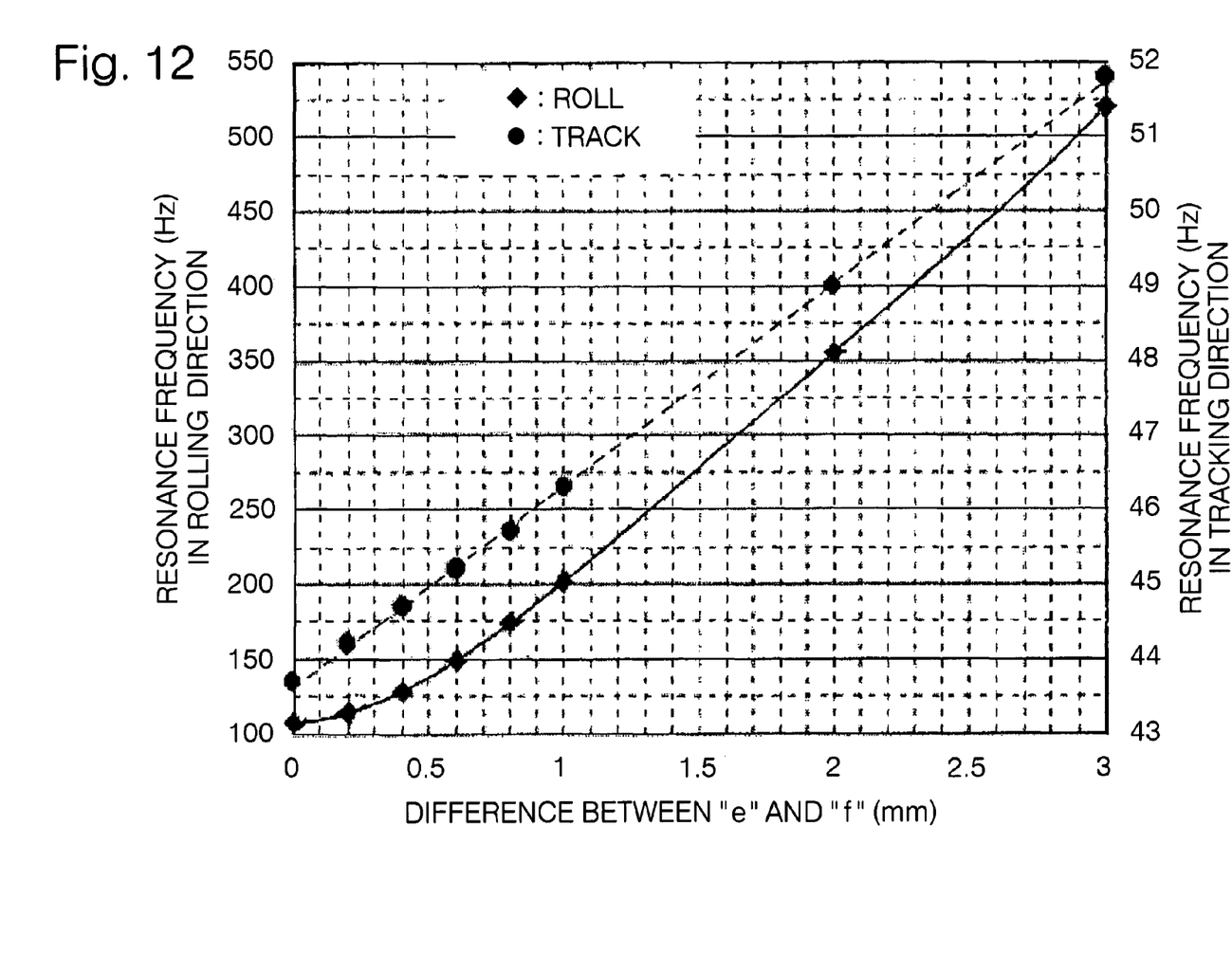
FIG. 12 is a graph illustrating the relation between the primary resonance frequency in the tracking direction and the primary resonance frequency in the tilt direction, in relation to a difference between a horizontal direction spacing "e" of supporting member mounting positions in the lens holder and a horizontal direction spacing "f" of supporting member mounting, positions in the fixed block, for illustrating an operation of the third embodiment of the objective lens driving device in accordance with the present invention.

FIG. 12 is a graph illustrating the relation between the primary resonance frequency in the tracking direction and the primary resonance frequency in the tilt direction, in relation to a difference between a radial direction spacing "e" of the mounting positions of the supporting member 6 to the lens holder 2A and a radial direction spacing "f" of the mounting positions of the supporting member to the fixed block.

In this case, the reference spacing of the spring wires is 8.6 mm, and the length of the spring wires is 10.6 mm.

As seen from FIG. 12, by comparing one case in which the difference between the radial direction spacing "e" of the mounting positions of the supporting members 6 to the lens holder 2A, and the radial direction spacing "f" of the mounting positions of the supporting members 6 to the fixed block 7 is 0.43 mm (5%) with another case in which the radial direction spacing "e" of the mounting positions of the supporting members 6 to the lens holder 2A, is equal to the radial direction spacing "f" of the mounting positions of the supporting members 6 to the fixed block 7 so that the supporting members 6 are in parallel to each other when the supporting members 6 are viewed from the focusing direction, the primary resonance frequency of the tracking direction slightly change on the order of 1 Hz, but the primary resonance frequency of the rolling direction rises on the order of 30 Hz.

In the case that the radial direction spacing "e" of the mounting positions of the supporting members 6 to the lens holder 2A, is equal to the radial direction spacing "f" of the mounting positions of the supporting members 6 to the fixed block 7 so that the supporting members 6 are in parallel to each other when the supporting members 6 are viewed from the focusing direction, if it is so designed that the primary resonance frequency of the focusing direction and the tracking direction is on the order of 45 Hz, the primary resonance frequency of the rolling direction becomes the order of 70 Hz.

Recently, in order to realize an increased data tranfer rate, the number of revolution of the optical disk medium has the inclination of increasing, and the rotational frequency exceeds 100 Hz in some cases.

Accordingly, the rotational frequency of the optical disk medium approaches the resonance frequency of the rolling direction in some cases. In such a case, there occurs a problem in which a resonance phenomenon occurs in the rolling mode.

Under this circumstance, by increasing the difference between the radial direction spacing "e" of the mounting positions of the supporting members 6 to the lens holder 2A, and the radial direction spacing "f" of the mounting positions of the supporting members 6 to the fixed block 7, it is possible to elevate only the resonance frequency of the rolling direction to a high value which is sufficiently higher than 100 Hz of the rotational frequency of the optical disk medium, in comparison with the primary resonance frequency of the tracking direction.

Thus, the rotational frequency of the optical disk medium never becomes coincident with the resonance frequency of the tilt, so that it is possible to avoid the influence of the rolling mode.

Incidentally, the cross section of the spring wire is not limited to a circle, but a similar advantage can be obtained if the cross section of the spring wire is square or rectangular. In addition, the spring wire is not limited to a straight line, but a similar advantage can be obtained if the spring wire is arched or if a dumping agent is coated on a middle portion of the spring wire.

As mentioned above in detail, the objective lens driving device in accordance with the present invention can exert the following advantages:

A first advantage is to be capable of obtaining the characteristics in which the variation in the sensitive and the linearity of the tilt movement is small when the objective lens is shifted in the tracking direction. The reason for this is that, by putting the ratio of the gap between the tilt magnet and the tilt coil to the thickness of the tilt magnet, in the range of 1/1.5 to 1/3, the objective lens driving device is used in a region in which the magnetic field strength is substantially uniform.

A second advantage is to be capable of obtaining the characteristics in which the variation in the sensitivity and the linearity of the tilt movement is small when the objective lens is shifted in the focusing direction. The reason for this is that, by putting the ratio of the inner size in the focusing direction of the tilt coil to the height of the tilt magnet, in the range of 1/2 to 1/4, the objective lens driving device is used in a region in which the magnetic field strength is substantially uniform, and the objective lens driving device can be used most efficiently with the minimized coil size.

A third advantage is to be capable of enlarging the accessible area at the center side portion of the optical disk medium in the objective lens driving device having the radial tilt driving mechanism. The reason for this is that, by minimizing the size of the center side tilt magnet or the size of both the center side tilt magnet and the periphery side tilt magnet, the objective lens driving device having the radial tilt driving mechanism can be minimized in size.

A fourth advantage is to be capable of preventing the occurrence of the resonance in the rolling mode even if the number of revolution of the optical disk medium is increased. The reason for this is that, by making the horizontal direction spacing of the mounting positions of the supporting members to the lens holder, different from the horizontal direction spacing of the mounting positions of the supporting members to the fixed block so that the supporting members are in parallel to each other when the supporting members are viewed from the focusing direction, it is possible to elevate the primary resonance frequency in the tilt direction, without substantially changing the primary resonance frequency in the focusing direction and in the tracking direction.

As mentioned above, for a disk having a large surface swing of the optical disk medium or a large amount of eccentricity, or for each of different disk having different thicknesses so as to having different optimum focal positions, even if the objective lens is shifted in the tracking direction or in the focusing direction, the tilt control of the objective lens can be stably controlled, and therefore, it is possible to provide the objective lens driving device capable of obtaining a good characteristics of information recording, reproducing and erasing.

In addition, it is possible to minimize the size of the objective lens driving device capable of the objective lens in the three directions of the focusing direction, the tracking direction and the radial tilt direction, and capable of increasing the accessible area at the center side portion of the optical disk medium.

What is claimed is:

1. An objective lens driving device comprising:
    a lens holder including an objective lens for condensing a light emanated from a light source onto an optical disk medium, a focusing coil for driving the objective lens in a light axis direction, a tracking coil for driving the objective lens in a radial direction, and tilt coils for driving the objective lens in a rotational direction within a plane including two axes of said light axis direction and said radial direction;
    a fixed block for supporting said lens holder by supporting members of supporting said lens holder;
    focusing and tracking magnets for generating an electromagnetic force acting on said focusing coil and said tracking coil;
    tilt magnets for generating an electromagnetic force acting on said tilt coils;
    wherein said tilt coils are wound in a multilayer and has an inner peripheral shape of a substantial rectangle, said tilt coils being mounted on opposite side surfaces of said lens holder in the radial direction,
    wherein said tilt magnets are located to put said lens holder between said tilt magnets in the radial direction and to oppose to said tilt coils, respectively, each of said tilt magnets being divided into two parts in a direction parallel to said light axis direction, said two parts being magnetized to have different polarities in the radial direction, respectively, and
    wherein when said lens holder is in a neutral position, a ratio of a gap between opposing surfaces of one tilt magnet and one tilt coil which oppose to each other, to a radial direction thickness of the tilt magnet, is in the range of 1/1.5 to 1/3.

2. An objective lens driving device claimed in claim 1 wherein in at least one tilt coil of said tilt coils, a ratio of a light axis direction inside distance of the tilt coil to a light axis direction height of said tilt magnet, is in the range of 1/2 to 1/4.

3. An objective lens driving device claimed in claim 2 wherein of said two tilt magnets, the tilt magnet located at a center side portion of the optical disk medium is smaller in size than the tilt magnet located at a periphery side portion of the optical disk medium.

4. An objective lens driving device claimed in claim 1 wherein said tilt magnets are formed of rare earth material.

5. An objective lens driving device claimed in claim 1 wherein of said two tilt magnets, the tilt magnet located at a center side portion of the optical disk medium is smaller in size than the tilt magnet located at a periphery side portion of the optical disk medium.

6. An objective lens driving device claimed in claim 1 wherein a radial direction spacing of mounting positions of said supporting members to said fixed block is longer than a radial direction spacing of mounting positions of said supporting members to said lens holder.

7. An objective lens driving device comprising:
- a lens holder including an objective lens for condensing a light emanated from a light source onto an optical disk medium, a focusing coil for driving the objective lens in a light axis direction, a tracking coil for driving the objective lens in a radial direction, and tilt coils for driving the objective lens in a rotational direction within a plane including two axes of said light axis direction and said radial direction;
- a fixed block for supporting said lens holder by supporting members of supporting said lens holder;
- focusing and tracking magnets for generating an electromagnetic force acting on said focusing coil and said tracking coil;
- tilt magnets for generating an electromagnetic force acting on said tilt coils;
- wherein said tilt coils are wound in a multilayer and has an inner peripheral shape of a substantial rectangle, said tilt coils being mounted on opposite side surfaces of said lens holder in the radial direction,
- wherein said tilt magnets are located to put said lens holder between said tilt magnets in the radial direction and to oppose to said tilt coils, respectively, the light axis direction height of said tilt magnets being lower than a center portion of said tilt coils in the form of the substantial rectangle, said tilt magnets being magnetized to have only one polarity in the radial direction, and
- wherein when said lens holder is in a neutral position, a ratio of a gap between opposing surfaces of one tilt magnet and one tilt coil which oppose to each other, to a radial direction thickness of the tilt magnet, is in the range of 1/1.5 to 1/3.

8. An objective lens driving device claimed in claim 7 wherein a radial direction spacing of mounting positions of said supporting members to said fixed block is longer than a radial direction spacing of mounting positions of said supporting members to said lens holder.

* * * * *